US011885225B1

(12) United States Patent
Freeman et al.

(10) Patent No.: US 11,885,225 B1
(45) Date of Patent: Jan. 30, 2024

(54) TURBINE BLADE TRACK WITH CERAMIC MATRIX COMPOSITE SEGMENTS HAVING ATTACHMENT FLANGE DRAFT ANGLES

(71) Applicant: Rolls-Royce Corporation, Indianapolis, IN (US)

(72) Inventors: Ted J. Freeman, Danville, IN (US); Aaron D. Sippel, Zionsville, IN (US); David J. Thomas, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/101,568

(22) Filed: Jan. 25, 2023

(51) Int. Cl.
*F01D 11/08* (2006.01)
*F01D 25/24* (2006.01)

(52) U.S. Cl.
CPC ............ *F01D 11/08* (2013.01); *F01D 25/246* (2013.01); *F05D 2240/11* (2013.01); *F05D 2300/6033* (2013.01)

(58) Field of Classification Search
CPC .... F01D 11/08; F01D 25/246; F01D 2240/11; F01D 2300/6033
See application file for complete search history.

(56) References Cited

U.S. PATENT DOCUMENTS 3,066,911 A 12/1962 Anderson et al.
3,807,891 A 4/1974 McDow et al.
3,880,435 A 4/1975 Thornbald
4,676,715 A 6/1987 Imbault et al.
4,863,345 A 9/1989 Thompson et al.
5,080,557 A 1/1992 Berger
5,116,199 A 5/1992 Ciokajlo
5,203,673 A 4/1993 Evans
5,295,787 A 3/1994 Leonard et al.
5,459,995 A 10/1995 Norton et al.
5,584,651 A 12/1996 Pietraszkiewicz et al.
5,593,276 A 1/1997 Proctor et al.
5,609,469 A 3/1997 Worley et al.
6,142,731 A 11/2000 Dewis et al.
6,821,085 B2 11/2004 Darkins et al.
6,877,952 B2 4/2005 Wilson
6,884,026 B2 4/2005 Glynn et al.
7,210,899 B2 5/2007 Wilson, Jr.
7,494,317 B2 2/2009 Keller et al.
7,534,086 B2 5/2009 Mazzola et al.
7,726,936 B2 6/2010 Keller et al.
7,753,643 B2 7/2010 Gonzalez et al.
8,128,350 B2 3/2012 Schiavo et al.
8,388,309 B2 3/2013 Marra et al.
8,790,067 B2 7/2014 Mccaffrey et al.
8,905,709 B2 12/2014 Dziech et al.
(Continued)

FOREIGN PATENT DOCUMENTS

FR 3056636 A1 3/2018

*Primary Examiner* — Audrey B. Walter
(74) *Attorney, Agent, or Firm* — Barnes & Thornburg LLP

(57) ABSTRACT

A turbine shroud assembly includes a carrier segment, a blade track segment, and a retainer. The carrier segment is formed to include an attachment-receiving space. The blade track segment includes a shroud wall and attachment flanges that extends radially outward from the shroud wall into the attachment-receiving space of the carrier segment. The retainer couples the blade track segment to the carrier segment.

20 Claims, 5 Drawing Sheets

(56) References Cited

U.S. PATENT DOCUMENTS 8,944,756 B2 2/2015 Lagueux
8,979,489 B2 3/2015 Taillant et al.
9,587,504 B2 3/2017 Mccaffrey et al.
9,587,517 B2 3/2017 Vetters et al.
9,863,265 B2 1/2018 Stapleton
9,874,104 B2 1/2018 Shapiro
10,024,193 B2 7/2018 Shapiro
10,030,541 B2 7/2018 Vetters et al.
10,082,039 B2 9/2018 Hanson
10,132,197 B2 11/2018 Heitman et al.
10,174,628 B2 1/2019 Humhauser et al.
10,301,960 B2 5/2019 Stapleton et al.
10,370,991 B2 8/2019 Wilson et al.
10,378,385 B2 8/2019 Tesson et al.
10,378,386 B2 8/2019 Roussille et al.
10,415,426 B2 9/2019 Quennehen et al.
10,415,427 B2 9/2019 Quennehen et al.
10,422,241 B2 9/2019 Mccaffrey et al.
10,428,688 B2 10/2019 Quennehen et al.
10,577,963 B2 3/2020 Mccaffrey
10,590,803 B2 3/2020 Quennehen et al.
10,598,045 B2 3/2020 Tableau et al.
10,605,120 B2 3/2020 Quennehen et al.
10,619,517 B2 4/2020 Quennehen et al.
10,626,745 B2 4/2020 Roussille et al.
10,655,501 B2 5/2020 Lepretre et al.
10,689,998 B2 6/2020 Stapleton et al.
10,690,007 B2 6/2020 Quennehen et al.
10,724,399 B2 7/2020 Carlin et al.
10,753,221 B2 8/2020 Barker et al.
10,787,924 B2 9/2020 Quennehen et al.
10,815,810 B2 10/2020 Barker et al.
10,907,487 B2 2/2021 Zurmehly et al.
10,907,501 B2 2/2021 Filippi et al.
10,934,872 B2 3/2021 Tableau et al.
10,968,761 B2 4/2021 Barker et al.
11,015,613 B2 5/2021 Kerns et al.
11,021,988 B2 6/2021 Tableau et al.
11,021,990 B2 6/2021 Filippi
11,028,720 B2 6/2021 Tableau et al.
11,041,399 B2 6/2021 Lutjen et al.
11,047,245 B2 6/2021 Mccaffrey
11,078,804 B2 8/2021 Tableau et al.
11,085,316 B2 8/2021 Barker et al.
11,085,317 B2 8/2021 Johnson et al.
11,111,822 B2 9/2021 Tableau et al.
11,111,823 B2 9/2021 Jarrossay et al.
11,143,050 B2 10/2021 Roy Thill et al.
11,174,747 B2 11/2021 Roy Thill et al.
11,174,795 B2 11/2021 Lutjen et al.
11,215,064 B2 1/2022 Arbona et al.
11,215,081 B2 1/2022 Schilling et al.
11,255,209 B2 2/2022 Clark et al.
11,326,470 B2 5/2022 Dyson et al.
11,365,635 B2 6/2022 Read et al.
11,441,434 B2 9/2022 Danis et al.
11,466,585 B2 10/2022 Arbona et al.
2007/0077141 A1* 4/2007 Keller .................... F01D 11/08
415/136
2009/0208284 A1 8/2009 Funnell
2016/0186611 A1 6/2016 Vetters et al.
2016/0186999 A1 6/2016 Freeman et al.
2016/0319688 A1 11/2016 Thibault et al.
2016/0333715 A1 11/2016 Mccaffrey
2017/0268366 A1 9/2017 Mccaffrey et al.
2018/0051581 A1 2/2018 Quennehen et al.
2018/0051591 A1 2/2018 Quennehen et al.
2018/0073398 A1 3/2018 Quennehen et al.
2018/0080343 A1 3/2018 Groleau et al.
2018/0156068 A1* 6/2018 Roussille .............. F01D 25/246
2018/0156069 A1 6/2018 Quennehen et al.
2018/0291769 A1 10/2018 Vetters et al.
2018/0355761 A1 12/2018 Maar
2019/0040758 A1 2/2019 Quennehen et al.
2019/0040761 A1 2/2019 Carlin et al.
2019/0084892 A1 3/2019 Subramanian et al.
2019/0101027 A1 4/2019 Lepretre et al.
2019/0128132 A1 5/2019 Tableau et al.
2019/0284958 A1* 9/2019 Schilling ............... F01D 25/246
2021/0131300 A1 5/2021 Arbona et al.
2022/0003126 A1 1/2022 Roy Thill et al.
2022/0056809 A1 2/2022 Hock et al.
2022/0120198 A1 4/2022 Schilling et al.

* cited by examiner

TURBINE BLADE TRACK WITH CERAMIC MATRIX COMPOSITE SEGMENTS HAVING ATTACHMENT FLANGE DRAFT ANGLES

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional fasteners such as rivets or bolts may not allow for the differing levels of expansion and contraction during operation of the gas turbine engine.

SUMMARY

The present disclosure may comprise one or more of the following features and combinations thereof.

A turbine shroud assembly for use with a gas turbine engine may include a carrier segment, a blade track segment, and a retainer. The carrier segment may be made of metallic materials and arranged circumferentially at least partway around a central axis of the gas turbine engine. The carrier segment may be formed to include an attachment-receiving space.

In some embodiments, the blade track segment may be made of ceramic matrix composite materials and supported by the carrier segment to locate the blade track segment radially outward of the axis and define a portion of a gas path of the turbine shroud assembly. The blade track segment may include a shroud wall, a first attachment flange, and a second attachment flange. The shroud wall may extend circumferentially partway around the central axis. The first attachment flange may extend radially outward away from the shroud wall into the attachment-receiving space of the carrier segment. The second attachment flange may be spaced apart axially from the first attachment flange that extends radially outward away from the should wall into the attachment-receiving space of the carrier segment.

In some embodiments, the retainer may extend axially into the carrier segment and through the first attachment flange and the second attachment flange of the blade track segment so as to couple the blade track segment to the carrier segment.

In some embodiments, the first attachment flange of the blade track segment may include a first axially aft-facing surface. The first axially aft-facing surface may face the second attachment flange. The first axially aft-facing surface may extend radially outward and axially forward away from the shroud wall at a first angle relative to a first radial plane. The first radial plane may extend radially and circumferentially relative to the central axis of the gas turbine engine.

In some embodiments, the second attachment flange of the blade track segment may include a first axially forward-facing surface. The first axially forward-facing surface may face the first attachment flange. The first axially forward-facing surface may extend radially outward and axially aft away from the shroud wall at a second angle relative to a second radial plane parallel to the first radial plane.

In some embodiments, the first angle and the second angle may be equal. The first angle and the second angle may be between about 0 and 5 degrees. The first angle and the second angle may be exactly 3 degrees.

In some embodiments, the first attachment flange of the blade track segment may include a second axially forward-facing surface opposite the first axially aft-facing surface. The second axially forward-facing surface may extend away from the shroud wall at a third angle relative to a third radial plane. The third radial plane may be parallel to the first and second radial planes. The second attachment flange of the blade track segment may include a second axially aft-facing surface opposite the first axially forward-facing surface. The second axially aft-facing surface may extend away from the shroud wall at a fourth angle relative to a fourth radial plane. The fourth radial plane may be parallel to the first, second, and third radial planes. The third and fourth angle may be different from the first and second angles.

In some embodiments, the third and fourth angles may be equal. The third and fourth angles may be about 0 degrees.

In some embodiments, the first attachment flange of the blade track segment may include a second axially forward-facing surface opposite the first axially aft-facing surface. The second axially forward-facing surface may extend radially outward and axially forward away from the shroud wall at a third angle relative to a third radial plane. The third radial plane may be parallel to the first and second radial planes. The third angle may be different from the first angle.

In some embodiments, the second attachment flange of the blade track segment may include a second axially aft-facing surface opposite the first axially forward-facing surface. The second axially aft-facing surface may extend radially outward and axially aft away from the shroud wall at a fourth angle relative to a fourth radial plane. The fourth radial plane may be parallel to the first, second, and third radial planes. The fourth angle may be equal to the third angle.

In some embodiments, the third and fourth angles may be between about 0 and 2 degrees. The third and fourth angles may be exactly 0.5 degrees.

In some embodiments, the first attachment flange may be formed to include a first retainer through hole. The first retainer through hole may extend axially through the first attachment flange relative to the central axis between the first axially aft-facing surface and the second axially forward-facing surface. The second attachment flange may be formed to include a second retainer through hole that extends axially through the second attachment flange relative to the central axis between the first axially forward-facing surface and the second axially aft-facing surface. The second retainer through hole may be radially and circumferentially aligned with the first retainer through hole so as to receive the retainer.

According to another aspect of the present disclosure, a turbine shroud assembly for use with a gas turbine engine may include a carrier segment, a blade track segment, and a retainer. The carrier segment may be arranged circumferentially at least partway around a central axis of the gas turbine engine. The blade track segment may be made of ceramic matrix composite materials and supported by the carrier segment.

In some embodiments, the blade track segment may include a shroud wall, a first attachment flange, and a second attachment flange. The shroud wall may extend circumferentially partway around the central axis to define a portion of a gas path of the gas turbine engine. The first attachment flange may extend radially outward away from the shroud wall into the carrier segment. The second attachment flange may be spaced apart axially from the first attachment flange that extends radially outward away from the should wall into the carrier segment.

In some embodiments, the retainer may extend axially into the carrier segment and through the first attachment flange and the second attachment flange of the blade track segment so as to couple the blade track segment to the carrier segment.

In some embodiments, the first attachment flange of the blade track segment may include a first axially aft-facing surface that faces the second attachment flange. The first axially aft-facing surface may extend radially outward and axially forward away from the shroud wall at a first angle relative to a first radial plane. The first radial plane may be orthogonal to the central axis of the gas turbine engine. The second attachment flange of the blade track segment may include a first axially forward-facing surface that faces the first attachment flange. The first axially forward-facing surface may extend radially outward and axially aft away from the shroud wall at a second angle relative to a second radial plane. The second radial plane may be parallel to the first radial plane.

In some embodiments, the first angle and the second angle may be equal. The first angle and the second angle may be about 1.5 degrees.

In some embodiments, the first attachment flange of the blade track segment may include a second axially forward-facing surface opposite the first axially aft-facing surface. The second axially forward-facing surface may extend radially outward and axially forward away from the shroud wall at a third angle relative to a third radial plane. The third radial plane may be parallel to the first and second radial planes. The third angle may be different from the first angle.

In some embodiments, the second attachment flange of the blade track segment may include a second axially aft-facing surface opposite the first axially forward-facing surface. The second axially aft-facing surface may extend away from the shroud wall at a fourth angle relative to a fourth radial plane. The fourth radial plane may be parallel to the first, second, and third radial planes. The fourth angle may be different from the second angle In some embodiments, the fourth angle may be equal to the third angle. The third and fourth angles may be about 0.5 degrees.

In some embodiments, the first attachment flange may be formed to include a first retainer through hole. The first retainer through hole may extend axially through the first attachment flange relative to the central axis. The second attachment flange may be formed to include a second retainer through hole. The second retainer through hole may extend axially through the second attachment flange relative to the central axis. The second retainer through hole may be radially and circumferentially aligned with the first retainer through hole so as to receive the retainer.

These and other features of the present disclosure will become more apparent from the following description of the illustrative embodiments.

DETAILED DESCRIPTION OF THE DRAWINGS

Figure 1:
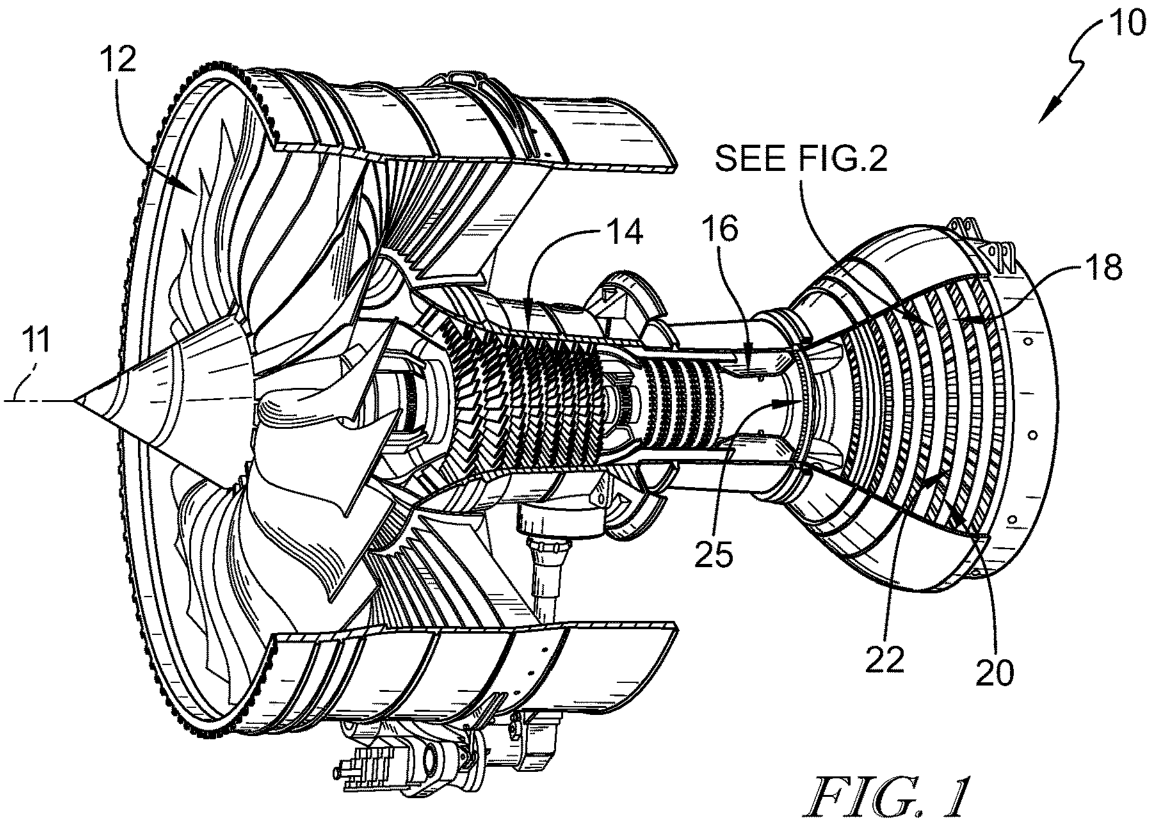
FIG. 1 is a cutaway perspective view of a gas turbine engine that includes a fan, a compressor, a combustor, and a turbine, the turbine including a turbine shroud that extends circumferentially around the axis and turbine wheels that are driven to rotate about an axis of the engine to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
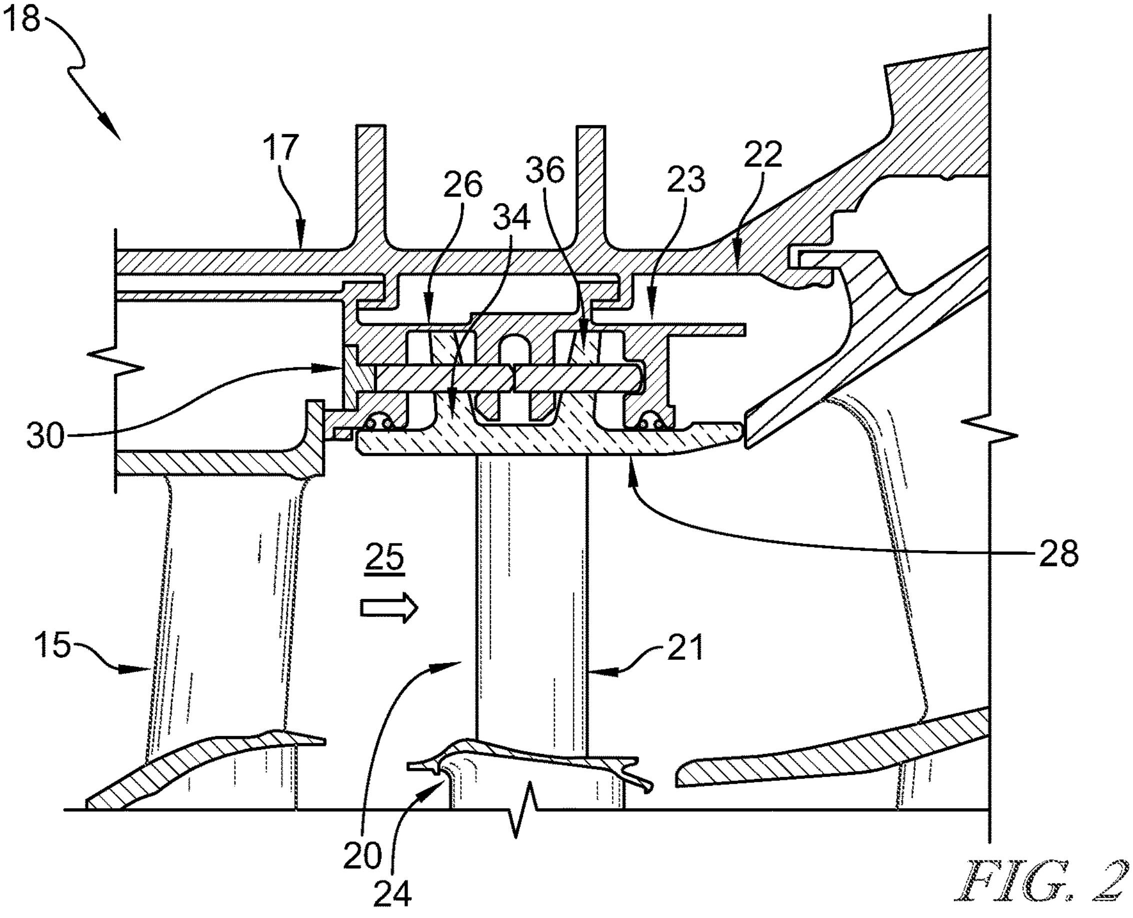
FIG. 2 is a cross-sectional view of a portion of the turbine included in the gas turbine engine of FIG. 1 showing one of the turbine wheel assemblies and the turbine shroud assembly arranged around the turbine wheel assembly, the turbine shroud assembly including a carrier segment, a blade track segment that defines a portion of a gas path of the turbine shroud assembly and includes a pair of attachment flanges that each extend radially outward from a shroud wall of the blade track segment, a retainer that couples the blade track segment to the carrier segment, and wherein each attachment flange extends from the shroud wall at an angle relative to a radial plane that extends radially and circumferentially relative to the axis of the gas turbine engine as shown in FIG. 4 so that the axial gap between the attachment flanges is larger at the radial outer ends of the attachment flanges than at the shroud segment.
Figure 4:
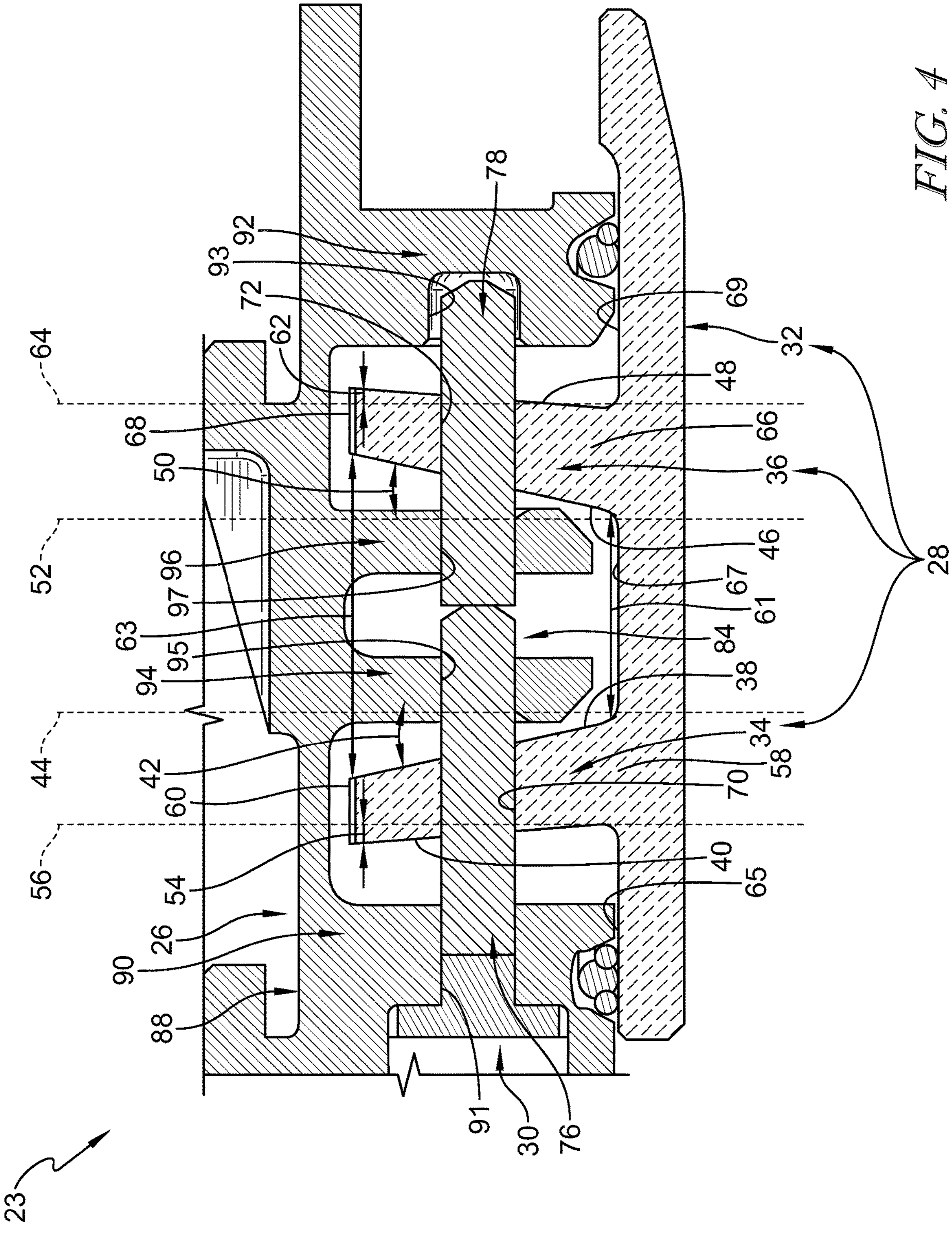
FIG. 4 is a detailed view of the turbine shroud assembly of FIG. 2 showing the blade track segment includes the shroud wall that defines the portion of the gas path, a first attachment flange that extends radially outward away from the shroud wall, and a second attachment flange spaced apart axially from the first attachment flange that extends radially outward away from the shroud wall, and further showing that the first attachment flange includes a first axially aft-facing surface that faces the second attachment flange and extends radially outward and axially forward away from the shroud wall at a first angle relative to the first radial plane and the second attachment flange includes a first axially forward-facing surface that faces the first attachment flange and extends radially outward and axially aft away from the shroud wall at a second angle relative to a second radial plane that is parallel to the first radial plane.

The turbine 18 includes at least one turbine wheel assembly 20 and a turbine shroud 22 positioned to surround the turbine wheel assembly 20 as shown in FIGS. 1 and 2. The turbine shroud 22 includes a turbine shroud assembly 23 having a carrier segment 26, a blade track segment 28, and a retainer 30 as shown in FIGS. 2 and 4. The carrier segment 26 is made of metallic materials and arranged circumferentially around the axis 11. The blade track segment 28 is made of ceramic matrix composite materials and is supported by the carrier segment 26 to locate the blade track segment 28 radially outward of the axis 11 to define a portion of the gas path 25. The retainer 30 is configured to couple the blade track segment 28 to the carrier segment 26.

The blade track segment 28 includes first and second attachment flanges 34, 36 that extend radially outward from a shroud wall 32 that defines a portion of the gas path 25 as shown in FIGS. 2 and 4. Each attachment flange 34, 36 has an axially facing surface 38, 46 that faces the other attachment flange 34, 36. The first attachment flange 34 has a first axially aft-facing surface 38 that faces the second attachment flange 36 and the second attachment flange 36 has a first axially forward-facing surface 46 that faces the first attachment flange 34.

As mentioned above, the blade track segment 28 comprises ceramic matrix composite materials in the illustrative embodiment. To manufacture the ceramic matrix composite blade track segments, ceramic fibers are woven together to form ceramic plies. Layers of ceramic plies are stacked to form the shape of the blade track segment, i.e. the shroud wall and attachment flanges. Once the desired shape is formed, the mold tool is assembled around the blade track segment to get the desired shape of the component before the blade track segment is infiltrated with a slurry material. After infiltration, heat and pressure is then applied to form a ceramic matrix composite black track segment while the mold tool is still in place.

However, when the mold tool is removed from the ceramic matrix composite blade track segment, the attachment features experience a high degree of shear force. Removal of the mold tool creates a shear force along the axially facing surfaces of the attachment flanges. This shear force causes the outer layers of the ceramic plies to pull apart from the underlying layers of ceramic plies of the blade track segment, thereby weakening the ceramic matrix composite material and the structural integrity of the blade track segment.

Thus, the axially facing surfaces 38, 46 of the corresponding attachment flanges 34, 36 each extend radially and axially away from the shroud wall 32 at an angle 42, 50 relative to a radial plane 44, 52 as shown in FIG. 4. The first axially aft-facing surface 38 extends at a first angle 42 relative to a first radial plane 44, while the first axially forward-facing surface 46 extends at a second angle 50 relative to a second radial plane 52 that is parallel to the first radial plane 44. The angled axially facing surfaces 38, 46 make it easier to manufacture the blade track segment 28 from ceramic matrix composite materials by reducing the shear force created when removing a mold tool 102 from the blade track segment 28.

The first angle 42 of the first axially aft-facing surface 38 and the second angle 50 of the first axially forward-facing surface 46 reduce the shear force on the first axially aft-facing surface 38 and the first axially forward-facing surface 46 created when the mold tool 102 is removed, thereby reducing the shear force on the first and second attachment flanges 34, 36 such that the ceramic plies remain in place as the mold tool 102 is removed. The reduction in shear force created during the mold tool removal process minimizes damage to the ceramic matrix composite blade track segment 28.

In the illustrative embodiment, the first attachment flange 34 of the blade track segment 28 includes the first axially aft-facing surface 38 that faces the second attachment flange 36 and a second axially forward-facing surface 40 opposite the first axially aft-facing surface 38 as shown in FIG. 4. The first axially aft-facing surface 38 extends radially outward and axially forward away from the shroud wall 32 at the first angle 42 relative to the first radial plane 44. The first radial plane 44 extends radially and circumferentially relative to the axis 11 of the gas turbine engine 10.

The second axially forward-facing surface 40 extends radially outward and axially forward away from the shroud wall 32 at a third angle 54 relative to a third radial plane 56 as shown in FIG. 4. Similar to the first angle 42, the third angle 54 helps reduce the shear force on the second axially forward-facing surfacd 40 when the mold tool 102 is removed.

The third radial plane 56 is parallel to the first radial plane 44 and the second radial plane 52 in the illustrative embodiment. The third radial plane 56 is located axially forward of the first radial plane 44 and the second radial plane 52. The first axially aft-facing surface 38 and the second axially forward-facing surface 40 of the first attachment flange 34 are not parallel to one another.

The first angle 42 formed by the first axially aft-facing surface 38 and the first radial plane 44 is greater than the third angle 54 formed by the second axially forward-facing surface 40 and the third radial plane 56 as shown in FIG. 4. The first angle 42 and the third angle 54 are not equal in the illustrative embodiment.

In the illustrative embodiment, the second attachment flange 36 of the blade track segment 28 includes the first axially forward-facing surface 46 and a second axially aft-facing surface 48 opposite the first axially forward-facing surface 46 as shown in FIG. 4. The first axially forward-facing surface 46 extends radially outward and axially aft away from the shroud wall 32 at the second angle 50 relative to the second radial plane 52. The second radial plane 52 extends radially and circumferentially relative to the axis 11 of the gas turbine engine 10. The second radial plane 52 is parallel to the first radial plane 44. The second radial plane 52 is located axially aft of the first radial plane 44.

The second axially aft-facing surface 48 extends away from the shroud wall 32 at a fourth angle 62 relative to a fourth radial plane 64 as shown in FIG. 4. Similar to the second angle 50, the fourth angle 62 helps reduce the shear force on the second axially aft-facing surfacd 48 when the mold tool 102 is removed.

The fourth radial plane 64 is parallel to the first radial plane 44, the second radial plane 52, and third radial plane 56 in the illustrative embodiment. The fourth radial plane 64 is located axially aft of the first, second, and third radial planes 44, 52, 56. The second axially aft-facing surface 48 and the first axially forward-facing surface 46 of the second attachment flange are not parallel to one another.

The second angle 50 formed by the first axially forward-facing surface 46 and the second radial plane 52 is greater than the fourth angle 62 formed by the second axially aft-facing surface 48 and the fourth radial plane 64 as shown in FIG. 4. The second angle 50 and the fourth angle 62 are not equal in the illustrative embodiment.

It will be understood that FIGS. 1-6 are not to scale. For example, the angles 42, 50, 54, 62 and other dimensions are exaggerated for the purposes of clarity of illustration.

In the illustrative embodiment, the first angle 42 and the second angle 50 are equal. In other embodiments, first angle 42 and the second angle 50 may be different.

In some embodiments, the first angle 42 and the second angle 50 may be between 3 degrees and 10 degrees. In some embodiments, the first angle 42 and the second angle 50 may be between 3 degrees and 9 degrees. In some embodiments, the first angle 42 and the second angle 50 may be between 3 degrees and 8 degrees. In some embodiments, the first angle 42 and the second angle 50 may be between 3 degrees and 7 degrees. In some embodiments, the first angle 42 and the second angle 50 may be between 3 degrees and 6 degrees. In some embodiments, the first angle 42 and the second angle 50 may be between 3 degrees and 5 degrees. In some embodiments, the first angle 42 and the second angle 50 may be between 3 degrees and 4 degrees.

In some embodiments, the first angle 42 and the second angle 50 may be between 4 degrees and 5 degrees. In some embodiments, the first angle 42 and the second angle 50 may be between 4 degrees and 6 degrees. In some embodiments, the first angle 42 and the second angle 50 may be between 4 degrees and 7 degrees. In some embodiments, the first angle 42 and the second angle 50 may be between 5 degrees and 6 degrees. In some embodiments, the first angle 42 and the second angle 50 may be between 5 degrees and 7 degrees.

The first angle 42 and the second angle 50 may be about 3 degrees in the illustrative embodiment. In some embodiments, the first angle 42 and the second angle 50 may be exactly 3 degrees. In some embodiments, the first angle 42 and the second angle 50 may be about 4 degrees. In some embodiments, the first angle 42 and the second angle 50 may be exactly 4 degrees. In some embodiments, the first angle 42 and the second angle 50 may be about 5 degrees. In some embodiments, the first angle 42 and the second angle 50 may be exactly 5 degrees.

The third angle 54 is different from the first angle 42 and the fourth angle 62 is different from the second angle 50 in the illustrative embodiment. In the illustrative embodiment, the third angle 54 and the fourth angle 62 are equal.

In some embodiments, the third angle 54 and the fourth angle 62 may be between 0 degrees and 1 degrees. In some embodiments, the third angle 54 and the fourth angle 62 may be between 1 degrees and 2 degrees. In some embodiments, the third angle 54 and the fourth angle 62 may be between 1 degrees and 3 degrees.

In the illustrative embodiment, the third angle 54 and the fourth angle 62 may be about 0.5 degrees. In some embodiments, the third angle 54 and the fourth angle 62 may be exactly 0.5 degrees. In some embodiments, the third angle 54 and the fourth angle 62 may be about 1 degrees. In some embodiments, the third angle 54 and the fourth angle 62 may be exactly 1 degrees. In some embodiments, the third angle 54 and the fourth angle 62 may be about 2 degrees. In some embodiments, the third angle 54 and the fourth angle 62 may be exactly 2 degrees.

In an alternative embodiment, the third angle 54 and the fourth angle 62 may be about 0 degrees such that the third angle 54 is parallel to the third radial plane 56 and the fourth angle 62 is parallel to the fourth radial plane 64. In an additional embodiment, the third angle 54 and the fourth angle 62 may be exactly 0 degrees such that the third angle 54 is parallel to the third radial plane 56 and the fourth angle 62 is parallel to the fourth radial plane 64.

Turning again to the turbine wheel assembly 20, the turbine wheel assembly includes a plurality of blades 21 coupled to a rotor disk 24 for rotation with the rotor disk 24. The hot, high-pressure combustion products from the combustor 16 are directed toward the blades 21 of the turbine wheel assemblies 20 along a gas path 25. The turbine wheel assembly 20 further includes a plurality of vanes 15 as shown in FIG. 2. The turbine shroud 22 is coupled to an outer case 17 of the gas turbine engine 10 and extends around the turbine wheel assembly 20 to block gases from passing over the blades 21 during use of the turbine 18 in the gas turbine engine 10.

The turbine shroud 22 is made up of a plurality of turbine shroud assemblies 23 in the illustrative embodiment. The turbine shroud assemblies 23 each extend circumferentially partway around the axis 11 and cooperate to surround the turbine wheel assembly 20. In other embodiments, the turbine shroud 22 is annular and non-segmented to extend fully around the axis 11 and surround the turbine wheel assembly 20. In yet other embodiments, certain components of the turbine shroud 22 are segmented while other components are annular and non-segmented.

Each turbine shroud assembly 23 includes the carrier segment 26, the blade track segment 28, and the retainer 30 as shown in FIGS. 2 and 4. The retainer 30 is configured to couple the blade track segment 28 to the carrier segment 26.

The carrier segment 26 includes an outer wall 88 and a plurality of mount flanges 90, 92, 94, 96 as shown in FIGS. 2 and 4. The outer wall 88 extends circumferentially partway around the axis 11. The plurality of mount flanges 90, 92, 94, 96 extend radially inward from the outer wall 88 and have a circumferential extent that extends along the circumferential extent of the outer wall 88. The plurality of mount flanges 90, 92, 94, 96 are each formed to include corresponding holes 91, 93, 95, and 97 that receive the retainer 30 when the retainer 30 is inserted into the carrier segment 26 and through the blade track segment 28.

The plurality of mount flanges 90, 92, 94, 96 includes a first mount flange 90 and a second mount flange 92 as shown in FIGS. 2 and 4. The first mount flange 90 extends radially inward from the outer wall 88. The second mount flange 92 is axially spaced apart from the first mount flange 90 and extends radially inward from the outer wall 88. In the illustrative embodiment, the first mount flange 90 is located at an axially forward end of the outer wall 88 and the second mount flange 92 is located at an axially aft end of the outer wall 88 as shown in FIGS. 2 and 4.

In the illustrative embodiment, the carrier segment 26 further includes a third mount flange 94 and a fourth mount flange 96 as shown in FIGS. 2 and 4. The third mount flange 94 extends radially inward from the outer wall 88 of the carrier segment 26. The fourth mount flange 96 extends radially inward from the outer wall 88 of the carrier segment 26. The fourth mount flange 96 is spaced apart from and located axially aft of the third mount flange 94 as shown in FIG. 4. The fourth mount flange 96 is located axially forward of the second mount flange 92. The third mount flange 94 is located axially aft of the first mount flange 90. The third and fourth mount flanges 94, 96 may be inner mount flanges or clevises that are both located axially inward of the first mount flange 90 and the second mount flange 92.

In the illustrative embodiment, the first attachment flange 34 and the second attachment flange 36 of the blade track segment 28 extend radially outward from the shroud wall 32 into the spaces between the plurality of mount flanges 90, 92, 94, 96. The first attachment flange 34 of the blade track segment 28 extends radially outward from the shroud wall 32 between the first mount flange 90 and the third mount flange 94 so that the first attachment flange 34 is located axially between the first mount flange 90 and the third mount flange 94. The second attachment flange 36 extends radially outward from the shroud wall 32 between the second mount flange 92 and the fourth mount flange 96 so that the second attachment flange is located axially between the fourth mount flange 96 and the second mount flange 92.

In the illustrative embodiment, the first mount flange 90 is formed to include a hole 91 that extends axially through the first mount flange 90 as shown in FIG. 4. The retainer 30 extends through the hole 91 when the retainer 30 is inserted into the carrier segment 26 and through the blade track segment 28.

In the illustrative embodiment, the second mount flange 92 is formed to include a blind hole 93 that extends axially into the second mount flange 92 as shown in FIG. 4. The blind hole 93 receives the retainer 30 when the retainer 30 is inserted into the carrier segment 26 and through the blade track segment 28.

In the illustrative embodiment, the third and fourth mount flanges 94, 96 are formed to include holes 95, 97 as shown in FIG. 4. The holes 95, 97 receive the retainer 30 when the retainer 30 is inserted into the carrier segment 26 and through the blade track segment 28.

The blade track segment includes the shroud wall 32, the first attachment flange 34, and the second attachment flange 36 as shown in FIGS. 2 and 4. The first attachment flange 34 and the second attachment flange 36 extend radially outward from the shroud wall 32 toward the carrier segment 26. The first attachment flange 34 is located axially forward of the second attachment flange 36.

The shroud wall 32 of the blade track segment 28 includes a forward face 65, a middle face 67, and an aft face 69 as shown in FIG. 4. The forward face 65, the middle face 67, and the aft face 69 define a radially outward facing surface of the shroud wall 32. The forward face 65 is located axially forward of the first attachment flange 34. The middle face 67 is located axially between the first attachment flange 34 and the second attachment flange 36. The aft face 69 is located axially aft of the second attachment flange 36.

The first attachment flange 34 extends radially outward from a first flange base 58 near the shroud wall 32 to a first flange radially outer end 60 as shown in FIG. 4. The first flange radially outer end 60 of the first attachment flange 34 is spaced apart radially from the first flange base 58. The first axially aft-facing surface 38 and the second axially forward-facing surface 40 each extend from the base 58 to the first flange radially outer end 60. The width of the first flange base 58 is greater than the width of the first flange radially outer end 60 in the illustrative embodiment.

The second attachment flange 36 extends radially outward from a second flange base 66 near the shroud wall 32 to a second flange radially outer end 68 as shown in FIG. 4. The second flange radially outer end 68 of the second attachment flange 36 is spaced apart radially from the second flange base 66. The first axially forward-facing surface 46 and the second axially aft-facing surface 48 each extend from the base 66 to the second flange radially outer end 68. The width of the second flange base 66 is greater than the width of the second flange radially outer end 68 in the illustrative embodiment.

The axial gap 61 between the first flange base 58 of the first attachment flange 34 and the second flange base 66 of the second attachment flange 36 is smaller than the axial gap 63 between the first flange radially outer end 60 of the first attachment flange 34 and the second flange radially outer end 68 of the second attachment flange 36 as shown in FIG. 4. The first flange base 58 and the second flange base 66 have the same width in the illustrative embodiment. The first flange radially outer end 60 and the second flange radially outer end 68 have the same width in the illustrative embodiment.

Figure 3:
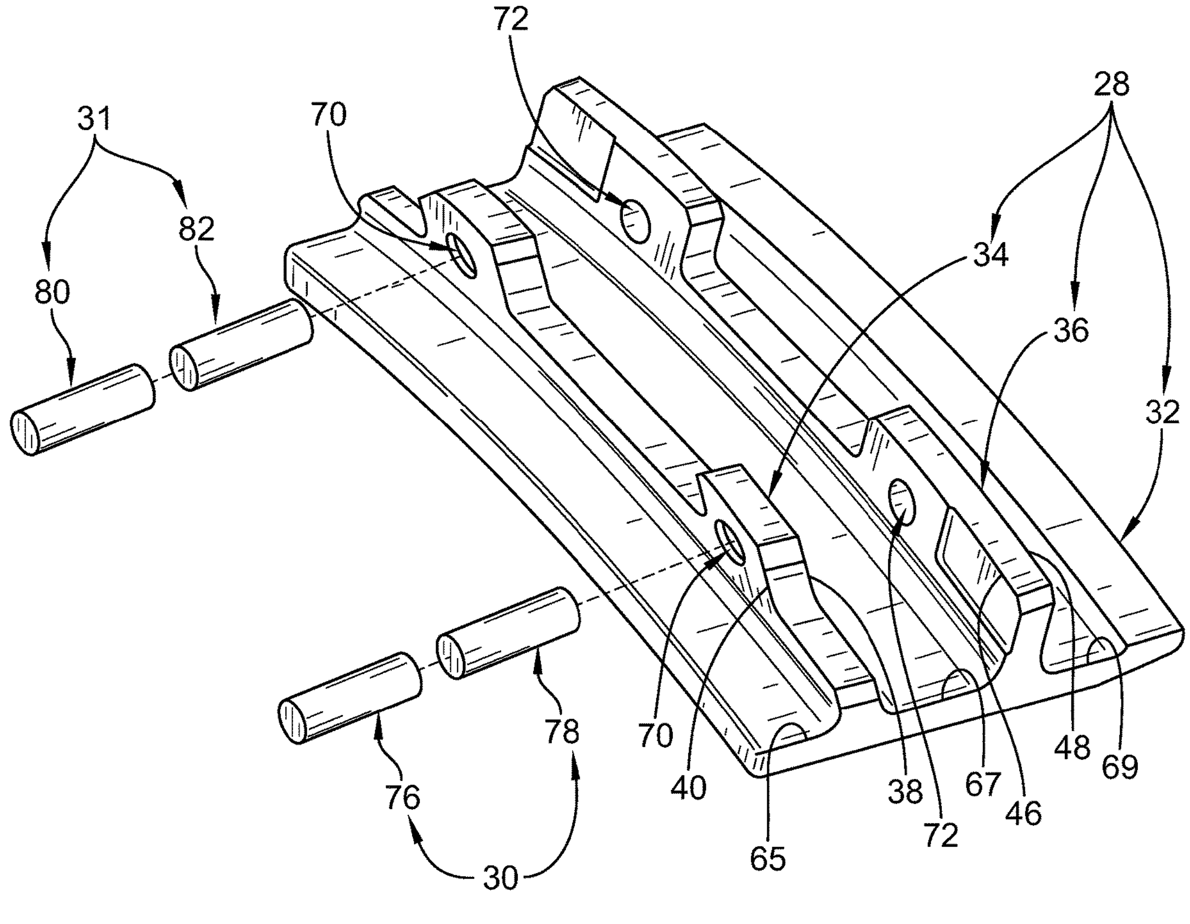
FIG. 3 is an exploded view of the turbine shroud assembly of FIG. 2 showing the blade track segment and two retainers circumferentially spaced apart from one another, and further showing that each of the attachment flanges of the blade track segment are formed to include a retainer through hole extending axially through the corresponding attachment flange.

In the illustrative embodiment, the first attachment flange 34 is formed to include a first retainer through hole 70 and the second attachment flange 36 is formed to include a second retainer through hole 72 as shown in FIGS. 2-4. Each of the through holes 70, 72 are configured to receive the retainer 30.

The first retainer through hole 70 extends axially through the first attachment flange 34 relative to the axis 11 between the first axially aft-facing surface 38 and the second axially forward-facing surface 40. The second retainer through hole 72 extends axially through the second attachment flange 36 relative to the axis 11 between the first axially forward-facing surface 46 and the second axially aft-facing surface 48. The first retainer through hole 70 and the second retainer through hole 72 are radially and circumferentially aligned with one another so as to receive the retainer 30.

While the axially facing surfaces 38, 40, 46, 48 extend at angles 42, 50, 54, 62 relative to the radial planes 44, 52, 56, 64, the through holes 70, 72 each extend axially through the corresponding attachment flange 34, 36. This way, the retainer 30 extends axially through the attachment flanges 34, 36 relative to the axis 11.

The retainer 30 includes a forward pin 76 and an aft pin 78 as shown in FIGS. 3 and 4. The forward pin 76 is located axially forward of the aft pin 78. The forward pin 76 and the aft pin 78 are circumferentially aligned. The forward pin 76 is separate from the aft pin 78 so as to allow for independent loading during use in the gas turbine engine 10.

In the illustrative embodiment, the turbine shroud assembly 23 includes two retainers 30, 31 as shown in FIG. 3. The retainers 30, 31 are spaced apart circumferentially from each other as shown in FIG. 3. The retainers 30, 31 may have a circular cross-section, or may have any other suitable cross-section.

The retainer 31 includes a forward pin 80 and an aft pin 82 as shown in FIG. 4. The forward pin 80 is located axially forward of the aft pin 82. The forward pin 80 and the aft pin 82 are circumferentially aligned. The forward pin 80 is separate from the aft pin 82 so as to allow for independent loading during use in the gas turbine engine 10.

The retainer 30 is substantially similar to the retainer 31, the forward pin 76 is substantially similar to the forward pin 80, and the aft pin 78 is substantially similar to the aft pin 82 in the illustrative embodiment such that description of the retainer 30 applies to the retainer 31, description of the forward pin 76 applies to the forward pin 80, and description of the aft pin 78 applies to the aft pin 82.

The retainer 30 couples the blade track segment 28 to the carrier segment 26 as shown in FIGS. 2 and 4. The retainer 30 extends through the blade track segment 28 and into the carrier segment 26 to couple the blade track segment to the carrier segment.

In the illustrative embodiment, the retainer 30 extends through the hole 91 formed in the first mount flange 90, through the first retainer through hole 70 formed in the first attachment flange 34, through the holes 95, 97 formed in the third and fourth mount flanges 94, 96, through the second retainer through hole 72 formed in the second attachment flange 36, and into the blind hole 93 formed in the second mount flange 92. The forward pin 76 of the retainer 30 rests in the hole 91 formed in the first mount flange 90, the first retainer through hole 70 formed in the first attachment flange 34, and the hole 95 formed in the third mount flange 94. The aft pin 78 of the retainer 30 rests in the hole 97 formed in the fourth mount flange 96, the second retainer through hole 72 formed in the second attachment flange 36, and the blind hole 93 formed in the second mount flange 92.

Figure 5:
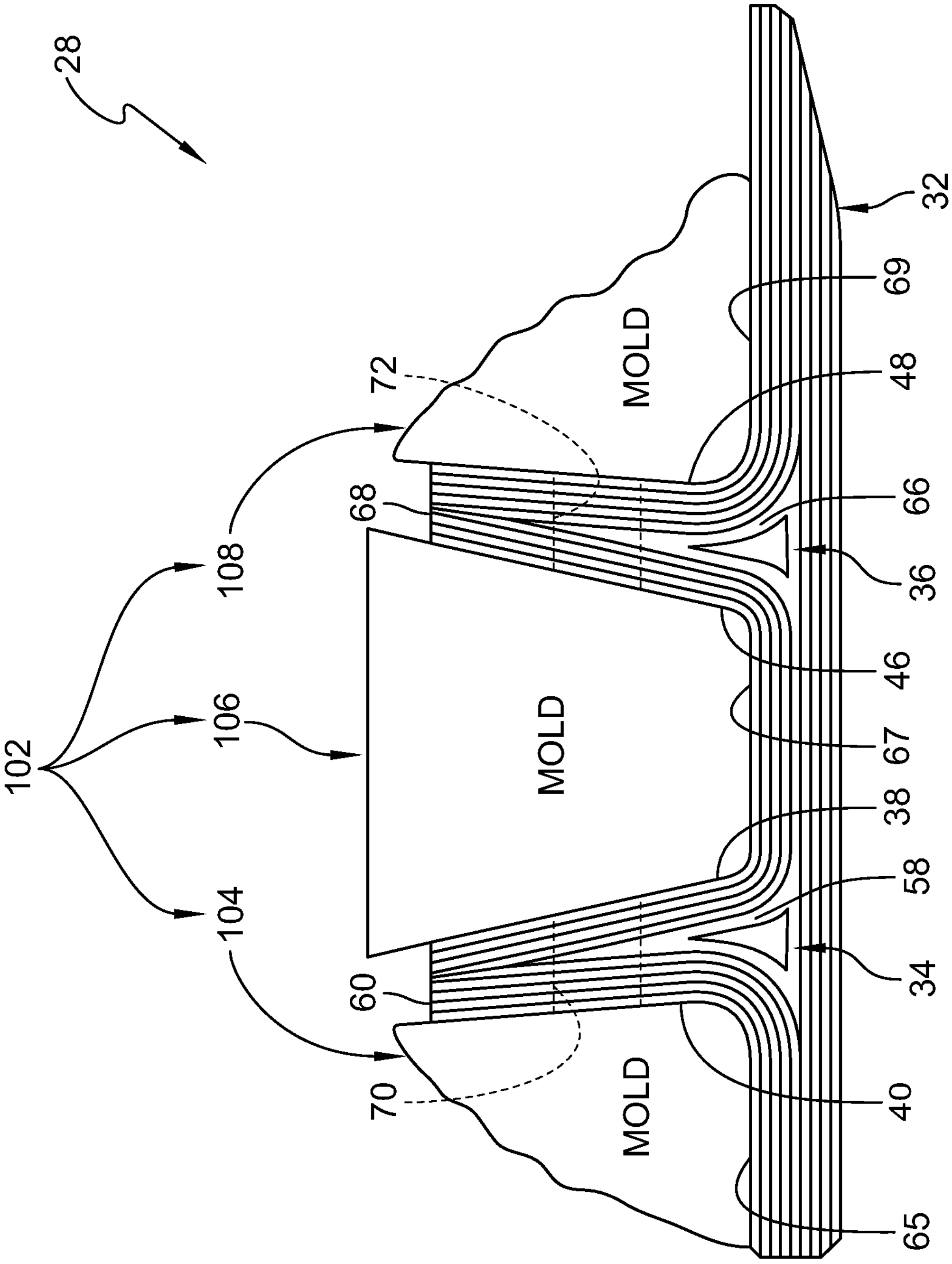
FIG. 5 is a cross-section view of the blade track segment to be included in the turbine shroud assembly of FIG. 2 showing a mold tool is located in the axial gap between the first attachment flange and the second attachment flange during a manufacturing process of the ceramic matrix composite blade track segment, and further showing layers of ceramic plies that form the attachment features of the blade track segment are more dense near the radial outer ends.
Figure 6:
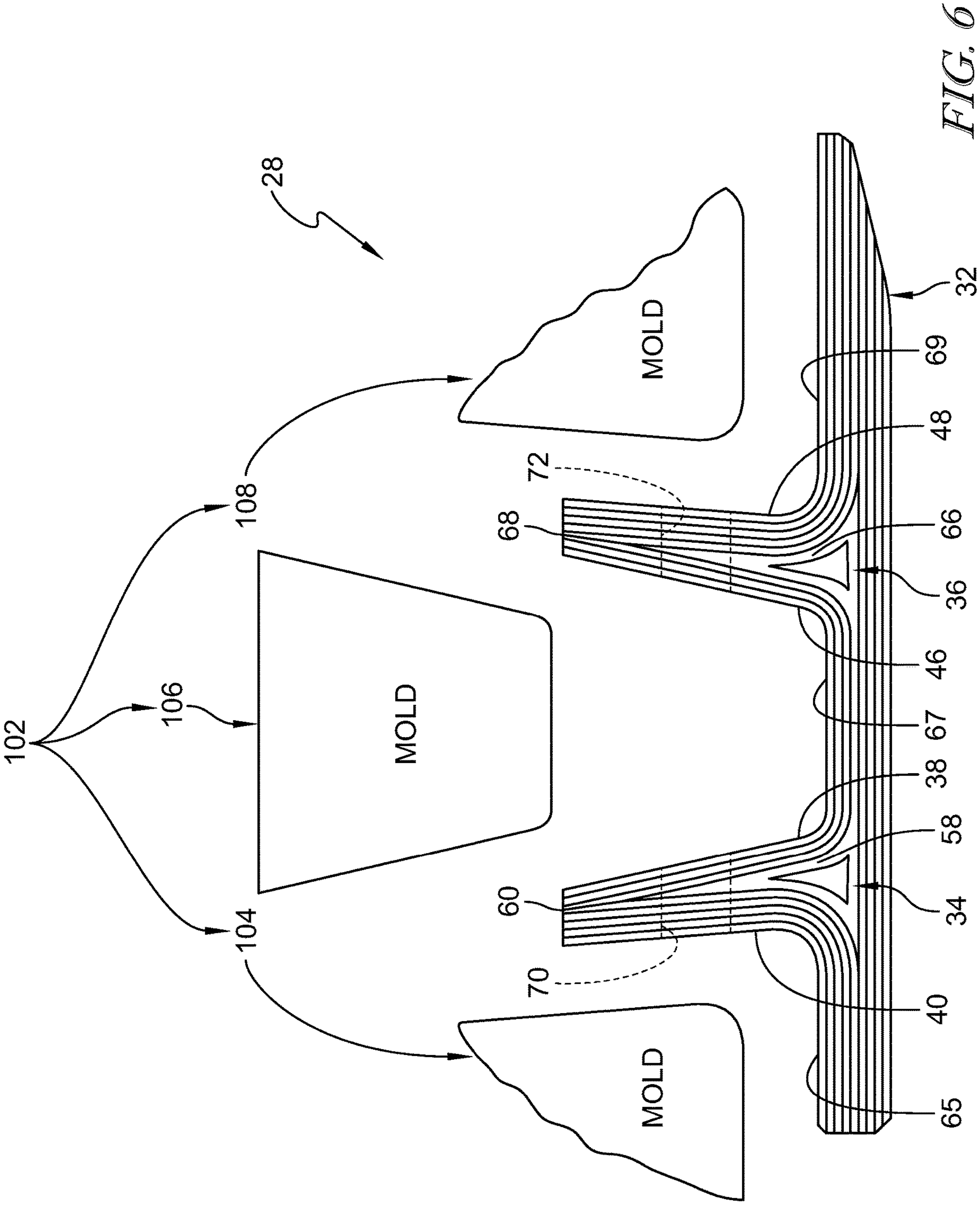
FIG. 6 is a view similar to FIG. 5 showing that when the mold tool is removed, the first axially aft-facing surface of the first attachment flange and the first axially forward-facing surface of the second attachment flange reduce the shear force on the first axially aft-facing surface of the first attachment flange and the first axially forward-facing surface of the second attachment flange that is created when the mold tool is removed.

To manufacture the blade track segment 28, a mold tool 102 is used as shown in FIGS. 5 and 6. The mold tool 102 may include a plurality of members that are assembled around the blade track segment 28 prior to infiltration.

In the illustrative embodiment, the mold tool 102 includes a forward mold member 104, a middle mold member 106, and an aft mold member 108 as shown in FIGS. 5 and 6. The forward mold member 104 of the mold tool 102 engages with the forward face 65 of the shroud wall 32 and the second axially forward-facing surface 40 of the first attachment flange 34. The middle mold member 106 of the mold tool 102 engages with the first axially aft-facing surface 38 of the first attachment flange 34, the middle face 67 of the shroud wall 32, and the first axially forward-facing surface 46 of the second attachment flange 36. The aft mold member 108 of the mold tool 102 engages with the second axially aft-facing surface 48 of the second attachment flange 36 and the aft face 69 of the shroud wall 32.

The angled axial facing surfaces 38, 46 engage angled surfaces on the middle mold member 106, thereby minimizing the shear force along the first axially aft-facing surface 38 of the first attachment flange 34 and the first axially forward-facing surface 46 of the second attachment flange 36 that is created by removing the middle mold member 106.

In other embodiments, where the attachment flanges 34, 36 are completely radial and parallel to the radial planes 44, 52, removal of the middle mold member 106 from between the attachment flanges 34, 36 creates a shear force along each attachment flange 34, 36. This may cause the layers of ceramic plies to separate from each other as the middle mold member 106 is removed. By angling the surfaces 38, 46, the shear force along the surfaces 38, 46 is minimized and prevents the outermost layers of ceramic plies, as suggested in FIGS. 5 and 6, from being pulled apart from inner layers.

The angle surfaces 38, 46 may also cause the layers of ceramic plies to be more dense near the radial ends 60, 68 of the attachment flanges 34, 36 compared to the base 58, 66 of the attachment flanges 34, 36. In the illustrative embodiment, the layers extend radially along the attachment flanges 34, 36.

For the purposes of the present disclosure, the modifier about means ±1% of the given value. Of course, greater or lesser deviation is contemplated and may be used in processed method within the spirit of this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a carrier segment made of metallic materials and arranged circumferentially at least partway around a central axis of the gas turbine engine, the carrier segment formed to include an attachment-receiving space, a blade track segment made of ceramic matrix composite materials and supported by the carrier segment to locate the blade track segment radially outward of the axis and define a portion of a gas path of the turbine shroud assembly, the blade track segment including a shroud wall that extends circumferentially partway around the central axis, a first attachment flange that extends radially outward away from the shroud wall into the attachment-receiving space of the carrier segment, and a second attachment flange spaced apart axially from the first attachment flange that extends radially outward away from the shroud wall into the attachment-receiving space of the carrier segment, and a retainer that extends axially into the carrier segment and through the first attachment flange and the second attachment flange of the blade track segment so as to couple the blade track segment to the carrier segment, and wherein the first attachment flange of the blade track segment includes a first axially aft-facing surface that faces the second attachment flange and extends radially outward and axially forward away from the shroud wall at a first angle relative to a first radial plane that extends radially and circumferentially relative to the central axis of the gas turbine engine, the second attachment flange of the blade track segment includes a first axially forward-facing surface that faces the first attachment flange and extends radially outward and axially aft away from the shroud wall at a second angle relative to a second radial plane parallel to the first radial plane, and wherein the first attachment flange of the blade track segment includes a second axially forward-facing surface opposite the first axially aft-facing surface that extends radially outward and axially forward away from the shroud wall at a third angle relative to a third radial plane that is parallel to the first and second radial planes and the third angle is different from the first angle.

2. The turbine shroud assembly of claim 1, wherein the first attachment flange is formed to include a first retainer through hole that extends axially through the first attachment flange relative to the central axis between the first axially aft-facing surface and the second axially forward-facing surface, the second attachment flange is formed to include a second retainer through hole that extends axially through the second attachment flange relative to the central axis between the first axially forward-facing surface and the second axially aft-facing surface, the second retainer through hole is radially and circumferentially aligned with the first retainer through hole so as to receive the retainer.

3. The turbine shroud assembly of claim 1, wherein the first angle and the second angle are about 1.5 degrees.

4. The turbine shroud assembly of claim 1, wherein the first angle and the second angle are equal.

5. The turbine shroud assembly of claim 4, wherein the first angle and the second angle are greater than 0 degrees and less than or equal to 5 degrees.

6. The turbine shroud assembly of claim 3, wherein the first angle and the second angle are exactly 3 degrees.

7. The turbine shroud assembly of claim 1, wherein the second attachment flange of the blade track segment includes a second axially aft-facing surface opposite the first axially forward-facing surface that extends radially outward and axially aft away from the shroud wall at a fourth angle relative to a fourth radial plane that is parallel to the first, second, and third radial planes and the fourth angle is equal to the third angle.

8. The turbine shroud assembly of claim 7, wherein the third and fourth angles are equal.

9. The turbine shroud assembly of claim 7, wherein the third and fourth angles are greater than 0 degrees and less than or equal to 2 degrees.

10. The turbine shroud assembly of claim 9, wherein the third and fourth angles are exactly 0.5 degrees.

11. A turbine shroud assembly for use with a gas turbine engine, the turbine shroud assembly comprising:

a carrier segment arranged circumferentially at least partway around a central axis of the gas turbine engine, a blade track segment made of ceramic matrix composite materials and supported by the carrier segment, the blade track segment including a shroud wall that extends circumferentially partway around the central axis, a first attachment flange that extends radially outward away from the shroud wall into the carrier segment, and a second attachment flange spaced apart axially from the first attachment flange that extends radially outward away from the shroud wall into the carrier segment, and a retainer that extends axially into the carrier segment and through the first attachment flange and the second attachment flange of the blade track segment, and wherein the first attachment flange of the blade track segment includes a first axially aft-facing surface that faces the second attachment flange and extends radially outward and axially forward away from the shroud wall at a first angle relative to a first radial plane that is orthogonal to the central axis of the gas turbine engine, the second attachment flange of the blade track segment includes a first axially forward-facing surface that faces the first attachment flange and extends radially outward and axially aft away from the shroud wall at a second angle relative to a second radial plane parallel to the first radial plane, and wherein the second attachment flange of the blade track segment includes a second axially aft-facing surface opposite the first axially forward-facing surface that extends away from the shroud wall at a third angle relative to a third radial plane that is parallel to the first and second radial planes and the third angle is different from the first angle and the second angle.

12. The turbine shroud assembly of claim 11, wherein the first attachment flange is formed to include a first retainer through hole that extends axially through the first attachment flange relative to the central axis, the second attachment flange is formed to include a second retainer through hole that extends axially through the second attachment flange relative to the central axis, the second retainer through hole is radially and circumferentially aligned with the first retainer through hole so as to receive the retainer.

13. The turbine shroud assembly of claim 11, wherein the first angle and the second angle are equal.

14. The turbine shroud assembly of claim 13, wherein the first angle and the second angle are about 1.5 degrees.

15. The turbine shroud assembly of claim 11, wherein the first attachment flange of the blade track segment includes a second axially forward-facing surface opposite the first axially aft-facing surface that extends radially outward and axially forward away from the shroud wall at a fourth angle relative to a fourth radial plane that is parallel to the first second, and third radial planes and the fourth angle is different from the first angle.

16. The turbine shroud assembly of claim 15, wherein the fourth angle is equal to the third angle.

17. The turbine shroud assembly of claim 16, wherein the third and fourth angles are about 0.5 degrees.

18. A shroud segment made of ceramic matrix composite materials for use with a gas turbine engine, the shroud segment comprising:

a shroud wall that extends circumferentially partway around a central axis of the gas turbine engine, a first attachment flange that extends radially outward away from the shroud wall, and a second attachment flange spaced apart axially from the first attachment flange that extends radially outward away from the shroud wall, wherein the first attachment flange of the blade track segment includes a first axially aft-facing surface that faces the second attachment flange and extends radially outward and axially forward away from the shroud wall at a first angle relative to a first radial plane that extends radially and circumferentially relative to the central axis of the gas turbine engine, the second attachment flange of the blade track segment includes a first axially forward-facing surface that faces the first attachment flange and extends radially outward and axially aft away from the shroud wall at a second angle relative to a second radial plane parallel to the first radial plane, wherein one of the first attachment flange and the second attachment flange of the blade track segment includes a second axially facing surface opposite one of the first axially aft-facing surface of the first attachment flange and the first axially forward-facing surface of the second attachment flange that extends radially outward and axially away from the shroud wall at a third angle relative to a third radial plane that is parallel to the first and second radial planes and the third angle is different from the first angle and the second angle.

19. The shroud segment of claim 18, wherein the first angle and the second angle are about 1.5 degrees.

20. The shroud segment of claim 18, wherein the third angle is about 0.5 degrees.

* * * * *